Patented Oct. 21, 1952

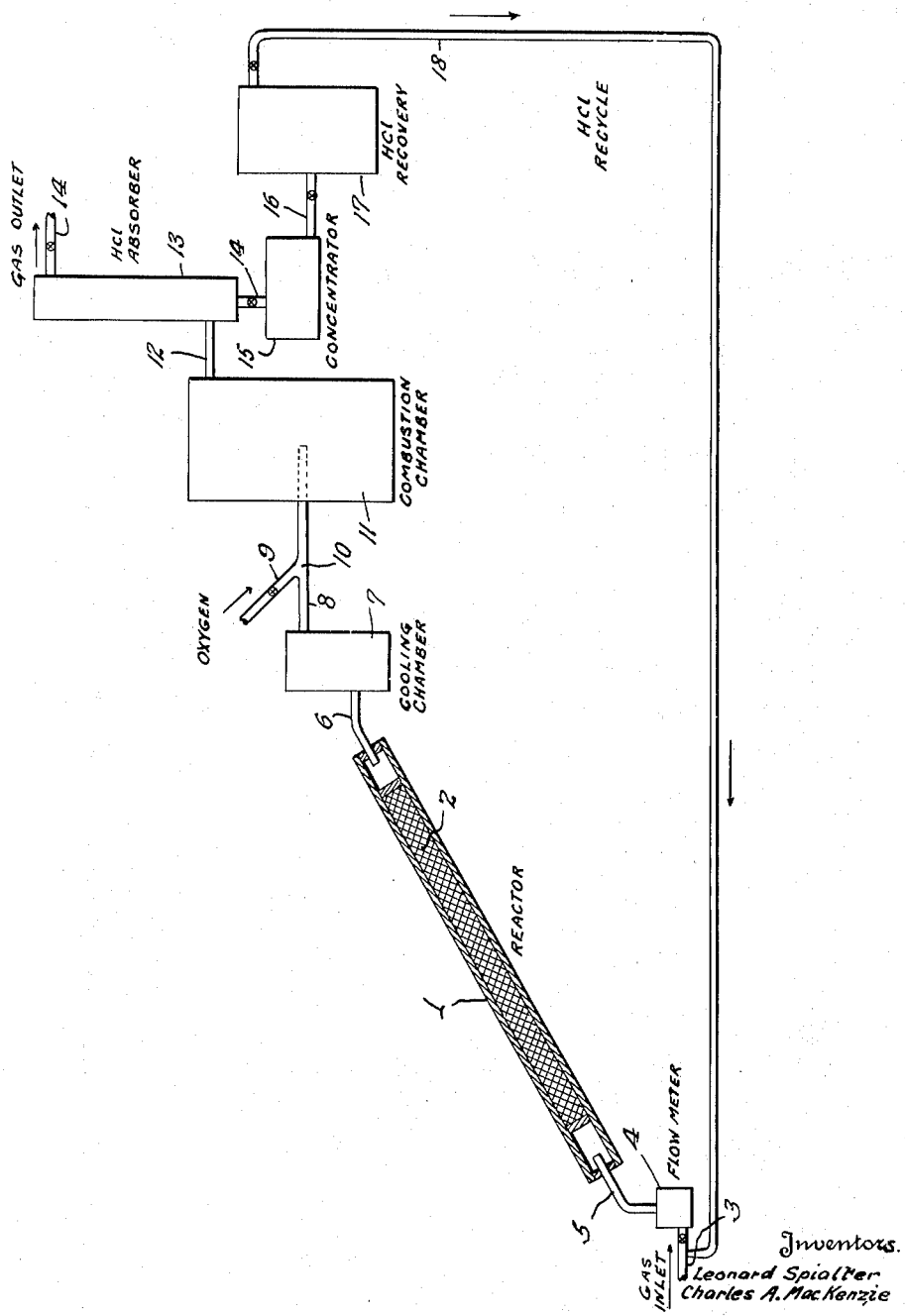

2,614,906

UNITED STATES PATENT OFFICE 2,614,906

IN THE METHOD OF MAKING FINELY DIVIDED SILICA, THE PRODUCTION OF A COMBUSTIBLE MIXTURE COMPRISING CHLORO SILICON HYDRIDES

Leonard Spialter, Newark, N. J., and Charles A. MacKenzie, New Orleans, La., assignors, by direct and mesne assignments, of one-half to Montclair Research Corporation, a corporation of New Jersey, and one-half to Ellis-Foster Company, a corporation of New Jersey Application March 27, 1947, Serial No. 737,703

2 Claims. (Cl. 23—182)

This invention relates to the production of finely divided silicon dioxide from silicon, as for example, silica produced by oxidation, more particularly from inorganic chlor silicon hydrides and related compounds prepared from silicon, to methods of preparing silica from such compounds, and to the products obtained.

Silica has been produced by combustion of silicon hydrides and more particularly by the burning of organo substituted silicon compounds such as ethyl silicate. The latter materials are relatively expensive and the presence of organic compounds with carbon present which must be burned also has an effect on the physical structure of the silica obtained.

Among the objects of the present invention is the production of finely divided silica from inorganic silicon compounds of relatively inexpensive character, which may be readily produced from silicon.

Other objects include the production of silica of novel properties.

Still further objects and advantages of the present invention will appear from the more detailed description set forth below, it being understood that such more detailed description is given by way of illustration and explanation only, and not by way of limitation, since various changes may be made therein by those skilled in the art without departing from the scope and spirit of the present invention.

In connection with such description there is shown in the accompanying drawing, a side elevation of apparatus useful in carrying out the present invention.

In accordance with the present invention it has been found that finely divided silica of novel character and particularly valuable for industrial purposes, as for compounding in rubber and other uses, may be readily produced by the utilization of the relatively inexpensive chlor silicon hydrides of inorganic character which may be readily obtained by treatment of silicon. The chlor silicon hydrides thus produced may be readily oxidized or burned to produce dense clouds of silica of finely divided character which may be readily recovered from such clouds.

The inorganic chloro silicon hydrides may be utilized in liquid condition or may be burned or oxidized in vapor stage, particularly in admixtures and this lends itself to the provision of a simple and inexpensive process for producing the chloro silicon hydrides and utilizing them in the production of finely divided silica and recovery of by-products as well. For this purpose hydrogen chloride, or a mixture of hydrogen and chlorine, or a mixture of hydrogen chloride and hydrogen, or of hydrogen chloride and chlorine, or of hydrogen chloride with hydrogen and chlorine, particularly utilizing the gases or gaseous mixtures in dry condition, may be passed over heated silicon to produce combustible mixtures containing varying quantities of silicon tetrachloride, silicochloroform, lower boiling chlor silicon hydrides, chlorosilanes, hydrogen, hydrogen chloride, etc. The temperatures employed in such reactors may vary substantially, as for example, from about 200 to 450° C., the preferred range, however, being between 250 and 400° C. Below 250° C. and above 400° C., the reaction products consist essentially of unreacted hydrogen chloride and silicon tetrachloride, respectively, which give non-combustible vapors. Furthermore as the temperature approaches the upper limit, the silica product obtained becomes coarser and larger in particle size. The temperatures employed depend in part on the gaseous reaction mixture being utilized. In general where chlorine gas is present in the initial gas fraction fed to the reactors, the lower limits of the temperature ranges given should be fairly closely adhered to, such as in the range from 250 to 300° C., in order to obtain good combustible mixtures. Instead of utilizing silicon metal, silicides such as of copper, iron, magnesium, calcium may be used. For example, ferro-silicon or calcium silicide, or mixtures of such alloys with silicon can be employed, particularly where any additional metals or elements present act as catalyzers for the reaction.

In essence in carrying out the invention in the manner just set forth above it involves a series of steps which may be formulated as follows:

HCl + Si → combustible gaseous mixture

Combustible gaseous mixture + air or $O_2$ →
$SiO_2$ + HCl

So that in the process it may be seen that the role of the hydrogen chloride or its equivalents is to carry the silicon over in a form which on burning will yield a desirable form of silica. The hydrogen chloride is recoverable from the combustion gases by any of the well-known commercial processes and may be recycled to the reactor for reaction with the silicon or its alloys.

From the reactor, the complex mixtures produced may be subjected to combustion or burning or they may be treated to remove from them any silicon tetrachloride and silicochloroform present leaving a residual combustible mixture containing the lower boiling chlorosilicon hydrides, residual hydrogen chloride, etc., which may then be subjected to combustion. The silicon tetrachloride and silicochloroform if segregated from the initial reaction product may be recovered and utilized industrially for various purposes including the production of organosilicon compounds. Either the initial reaction mixture or such mixture after separation of silicon tetrachloride and silicochloroform or either of them, may be admixed with air or oxygen and subjected to combustion.

The silica produced in any of these methods may be recovered for example, by having the combustion take place in a combustion chamber and removing the light powdery silica deposited on the walls of the chamber when the deposit is thick enough for that purpose. Hydrogen chloride may be recovered from the gases, as for example, by washing the gases with water to produce a solution of hydrochloric acid which may be concentrated and then treated in any desired way, as for example, with concentrated sulfuric acid following the technique of Sweeney, J. A. C. S., volume 39, page 2187 (1917), to recover anhydrous hydrogen chloride, which may be recycled back to the reaction zone for reaction with the silicon.

A continuous process for producing silica in finely divided condition and of unique character may be carried out continuously in apparatus of the character illustrated in the drawing. In that apparatus an iron pipe reactor 1 which may be an iron pipe of one inch diameter and of any desirable length such as 2 feet, may be charged with silicon 2 in a mesh size of from 4 to 20 for example, such silicon having a purity of 95+%. The reactor 1 with its contents is provided with heating means not shown, to maintain the desired temperature in this particular case for example, to be maintained at 280° C., the combustion tube furnace or reactor 1 desirably being inclined 30° from the horizontal. Anhydrous hydrogen chloride was passed in through the inlet 3 at a rate for example, of 800 cc. per minute as measured through the orifice flowmeter 4, from which it passed through the pipe 5 into the reactor 1 in contact with the silicon 2 therein and passed up to the bed of such hot silicon producing gaseous products which flow through the outlet pipe 6 through a cooling chamber 7. The cooled gases leaving the cooling chamber 7 through the outlet pipe 8 were mixed with six times their volume of air entering through the inlet pipe 9 through the Y 10 and the mixture of such gases with oxygen or air passed into the combustion chamber 11 where such gases were burned, as for example, at the end of a tube through which the gases were admitted into the combustion chamber 11 the finely divided silica collected on the walls of the chamber 11. The gaseous products of combustion were led through the outlet pipe 12 into the absorption chamber 13 where they were treated for absorption of the hydrogen chloride therein in a countercurrent of water, the water solution of hydrogen chloride flowing from the absorber 13 through pipe 14 into the concentrator 15. Residual gases leave the absorption chamber 13 through the outlet pipe 14 for any disposition desired depending on their contents. The water solution of hydrogen chloride is concentrated in the concentrator, as for example, to about 20° Bé., and from the concentrator is fed through the pipe 16 to the hydrogen chloride recovery chamber 17 where substantially anhydrous hydrogen chloride is recovered and may be recycled through the pipe 18 back to the inlet 3.

It will thus be seen by a relatively simple and inexpensive process finely divided silica may be readily produced from silicon or its alloys in a continuous method by treatment with hydrogen chloride or its equivalents which acts to form the agent through which the silicon is converted into silica, the hydrogen chloride being recoverable and recycled back into the process.

Such a process has a number of advantages in the use of relatively cheap starting materials, in the recovery of initial reagents so that essential reaction is a two-step conversion of silicon to silicon dioxide in finely divided form, and providing continuity in an inexpensive process.

The gaseous mixtures produced in reactor 1 as explained above may be directly subjected to combustion or burning or may first be mixed with combustible gases although the latter expedient is not necessary. Such combustible gases include vapors from inflammable liquids like diethyl ether, di-isopropyl ether, petroleum distillates, etc.

The silica clouds produced by any of the procedures set forth above may be collected, as for example, on a cooled surface or merely may be permitted to deposit on the walls of the combustion chamber and the white powdery silica recovered from such surfaces in the form of a light, finely divided product. It may be used for a number of purposes, as for example, in rubber formulations for vulcanized rubber and for other purposes. The silica may be heat treated, air-blown or treated in any other way for particular purposes. The production of finely divided silica by the combustion or burning of inorganic chloro silicon hydrides has an effect on the structure and nature of the silica produced making it particularly desirable for such utilization.

While the production of finely divided silica is particularly emphasized above, any of the procedures outlined where liquid chloro silicon hydrides are employed may be utilized for skywriting, in which case the materials employed consist of products which are inflammable on contact with air in order to produce the skywriting effect.

This application is a continuation-in-part of application Serial No. 665,877, filed April 29, 1946, now abandoned.

Having thus set forth our invention, we claim:

1. In a method of making finely divided silica, the step of continuously passing a current of a gas from the group consisting of a mixture of hydrogen and chlorine and a mixture of hydrogen chloride with hydrogen and chlorine, through a reaction zone over silicon heated to a temperature of from 200 to 450° C., to form a combustible mixture containing a plurality of chloro silicon hydrides.

2. The method as set forth in claim 1 in which the gas is a mixture of hydrogen and chlorine and the combustible mixture produced contains silicon tetrachloride, silicochloroform and lower boiling chloro silicon hydrides, condensing out the silicon tetrachloride and silicochloroform from the mixture, leaving a combustible mixture.

LEONARD SPIALTER.
CHARLES A. MacKENZIE.

REFERENCES CITED

The following references are of record in the file of this patent:

UNITED STATES PATENTS

| Number | Name | Date |
|---|---|---|
| 1,350,932 | Moore | Aug. 24, 1920 |
| 2,399,687 | McNabb | May 7, 1946 |
| 2,499,009 | Wagner | Feb. 28, 1950 |

OTHER REFERENCES

Mellor, "Inorganic and Theoretical Chemistry," vol. 6, pp. 968–969 (1925).